June 23, 1936.    S. W. CRAWFORD    2,044,834
MACHINE FOR LINING BEARINGS
Filed Oct. 3, 1935
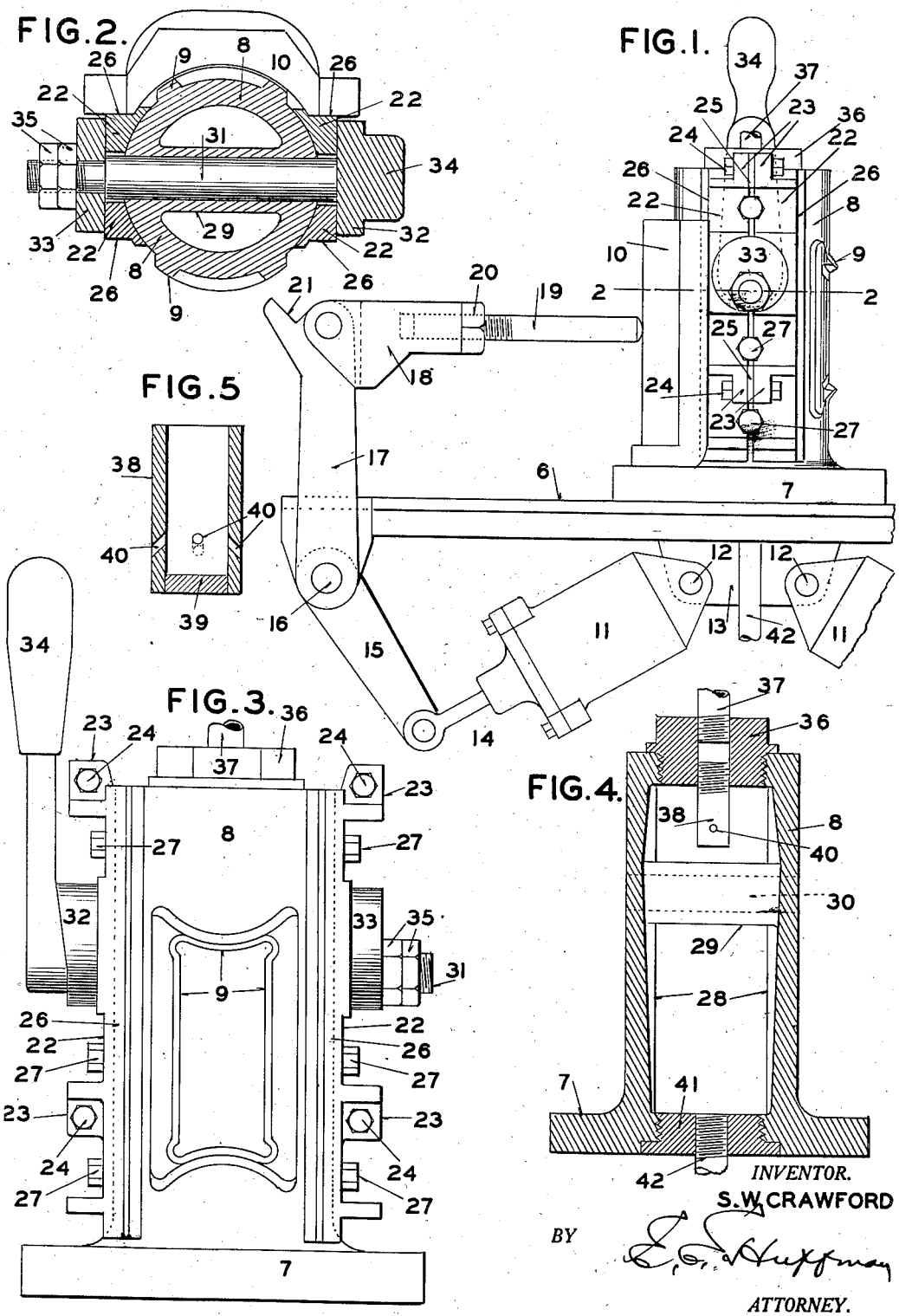
INVENTOR.
S. W. CRAWFORD
BY
ATTORNEY.

Patented June 23, 1936

2,044,834

UNITED STATES PATENT OFFICE 2,044,834

MACHINE FOR LINING BEARINGS

Samuel W. Crawford, St. Louis, Mo., assignor to National Bearing Metals Corporation, St. Louis, Mo., a corporation of New York Application October 3, 1935, Serial No. 43,461

2 Claims. (Cl. 22—123)

My invention relates to a machine for lining bearings and particularly to a machine for forming bearing linings having oil grooves or channels in their faces, such for example, as shown in U. S. Patent No. 1,908,122 granted to me May 9, 1933. The formation of the lining in such bearings presents difficulties not encountered in the lining of a bearing having a smooth face, and I have found that the types of lining machines heretofore in use for lining similar bearings having smooth faces are inadequate to successfully produce grooved or channeled bearings in commercial quantities. These difficulties arise from the fact that the mandrel of the lining machine must be provided with projecting ribs to form the grooves or channels, which ribs extend into proximity to the face of the bearing shell and retard the flow of the lining metal. Consequently, it is necessary that the lining metal be more fluid and therefore at a higher temperature than formerly in order to insure perfect castings. More adequate means for dissipating heat is thus necessary to enable the machine to be operated at sufficient speed to be economically practicable. The projecting ribs also cause increased adhesion between the finished bearing and the mandrel, requiring more effective means for detaching the bearing from the mandrel. Further accurate and adjustable spacing means is necessary to insure the proper relation between the bearing shell and the mandrel in bearings having linings of different degrees of thickness.

In the accompanying drawing which illustrates one form of machine for lining bearings made in accordance with my invention, Figure 1 is a side elevation; Figure 2 is a section taken on the line 2—2 of Figure 1, the bearing shell being shown in plan; Figure 3 is an enlarged side elevation, looking at right angles to Figure 1; Figure 4 is a vertical section of the mandrel; and Figure 5 is an enlarged section of the spray nozzle.

Referring first to Figure 1, the numeral 6 indicates a table upon which is mounted the base 7 of a hollow mandrel 8. The mandrel has formed on opposite sides thereof projecting ribs 9 for forming oil grooves in bearing linings. As shown in the drawings, these ribs are of such form as to produce grooves or channels like those disclosed in my prior patent above referred to, but they may be of other forms if so desired. To hold the bearing shell 10 in position while the lining is being cast, I provide a pair of fluid-actuated cylinders 11 pivoted at 12 to a lug 13 on the table. The piston rod 14 of each cylinder is pivoted to an arm 15 (only one of which is shown), which arm is rigidly secured to a rock shaft 16 carrying an upwardly projecting arm 17 to which is pivoted a block 18. Threaded in this block is a rod 19 adapted to engage the back of the bearing shell to hold it in position. The effective length of the rod may be varied by rotating it, and after adjustment is fixed by lock nut 20. When fluid is admitted to cylinder 11 by any suitable valve mechanism (not shown), the shell is held firmly in position by the action of the rod 19, as shown in Figure 1. After the lining has been applied, fluid is discharged from the cylinder, permitting arm 17 to move away from the mandrel after which block 18 may be swung against stop 21.

The bearing shell is not held directly against the mandrel but against a pair of cheek pieces secured to opposite sides of the mandrel at right angles to the ribs 9. Each of these cheek pieces comprises two similar parts 22 provided with lugs 23 for the passage of bolts 24 to secure the two parts of the cheek pieces together. Placed between the lugs 23 are shims 25, the number or thickness of which may be varied to move the contact faces 26 of the cheek pieces toward or away from the center line of the mandrel to produce linings of varying thickness. The cheek pieces are held in position against the mandrel by bolts 27, to receive which the mandrel is preferably provided on its inner face with bolt hole lugs 28.

The mandrel is provided with a bridge 29 in which is formed a transverse opening 30 for the reception of a rock shaft 31. This shaft carries a pair of cams 32 and 33, the former being formed integral with or rigidly secured to the shaft and provided with a handle 34 and the latter being removable to permit the insertion of the shaft. Lock nuts 35 secure the cam 33 in position. The upper end of the mandrel is closed by a plug 36 provided with a supply pipe 37 for delivering water to a spray nozzle 38 having its lower end closed by a plug 39 and provided with openings 40. These openings are preferably inclined downwardly, as shown in Figure 5, and may be of any suitable size and number to supply the required amount of cooling liquid to the walls of the mandrel. The lower end of the mandrel is closed by a plug 41 having an exhaust pipe 42 for carrying away the vapor generated by the impingement of the water spray against the heated walls of the mandrel.

In using my machine, a bearing shell is first tinned, to insure the proper unison between the shell and the lining, and is then clamped in position (as shown in Figure 1) and the lining metal poured into the shell through its open upper end. A second shell is then tinned, clamped in position at the opposite side of the mandrel and poured. Due to the rapid dissipation of heat accomplished by the application of the water spray against the interior of the mandrel, the first bearing will be sufficiently cooled for removal as soon as the second is poured. This may be readily accomplished without injury to the bearing, notwithstanding its firm adherence to the mandrel, by disengaging the clamping rod 19 and moving the handle 34 in the proper direction to force the cams 32 and 33 against the flanges of the bearing which project beyond the contact faces 26 of the cheek pieces, as shown in Figure 2.

Having fully described my invention, what I claim as new and desire to secure by Letters Patent of the United States is:

1. In a machine for lining bearings, the combination with a mandrel having on opposite faces thereof projections to form channels in bearing linings, a pair of cheek pieces secured to said mandrel and provided with contact faces for bearing shells, means for varying the width of said cheek pieces to alter the relation between said contact faces and mandrel, and means for securing bearing shells against said contact faces.

2. In a machine for lining bearings, the combination with a mandrel having on opposite faces thereof projections to form channels in bearing linings, a pair of cheek pieces secured to said mandrel and provided with contact faces for bearing shells, each of said cheek pieces being formed of two parts, shims positioned between said parts to vary the width of the cheek pieces, and means for securing bearing shells against said contact faces.

SAMUEL W. CRAWFORD.